# 3,037,915
METHOD FOR PREPARING STEROID COMPOUNDS

Rokuro Takeda, Kobe, and Itaru Nakanishi, Osaka, Japan, Hayao Nawa, Austin, Tex., and Masao Uchibayashi, Kawanishi, Tsunaharu Kusaka, Amagasaki, Jiro Terumichi and Minoru Uchida, Kobe, Michio Katsumata, Nishinomiya, Kikuko Yoshino, Osaka, and Hiroshi Fujitani, Minoo, Japan, assignors to Takeda Pharmaceutical Industries, Ltd., Osaka, Japan
No Drawing. Filed May 18, 1959, Ser. No. 813,685
Claims priority, application Japan May 26, 1958
13 Claims. (Cl. 195—51)

This invention relates to a new process for producing steroid compounds, and is based upon the finding that steroid compounds can be converted into other and more useful steroid compounds by treating the starting steroids with a culture of a microorganism belonging to either the genus Pseudomonas or the genus Serratia.

More specifically, the invention relates to a method for producing (1) 3,20-dione(or 20-ol-3-one)-compounds of the pregnane series in which, besides the 11 and/or 17 positions, the 21-position may or may not be oxygenated, or (2) their functional derivatives. As the starting compounds, there may be employed 3-one or 3,20-dione compounds of the pregnane series in which the 21-position may or may not be oxygenated, or their functional derivatives.

Production of the desired compounds is effected as follows according to the invention: a strain selected from either the genus Pseudomonas or the genus Serratia is incubated aerobically in a sterile medium containing the above-mentioned starting steroid, or the redox enzyme prepared from the microorganism is brought into aerobic contact with the starting steroid, whereupon (1) a double bond is formed between $C_1$ and $C_2$ of the starting steroid, or (2) the 11-position is oxygenated, if it is not initially oxygenated, or (3) hydrogenation occurs at the 20-position if the starting steroid is a 20-one compound, or (4) two or more of the above reactions are brought about simultaneously or successively.

In this specification, "oxygenation" of the starting steroid means the introduction of one or more hydroxyl or oxo groups into the designated positions, and "functional derivatives" imply, for example, a steroid derivative which is produced by changing the hydroxyl group at the 3-, 11-, 17-, 20-, or 21-position of the starting steroid into a functional group such as an ester, ether, halide, ketal, hydrazone, semicarbazone, etc. group, or a steroid derivative which is prepared by replacing the hydrogen atom attached to the 9-, 16-, or 19-position of the starting steroid with halogen, such as fluorine and chlorine, or by a hydroxyl group.

Typical steroid compounds which can be used as the starting material in the present invention may be exemplified as follows:

Pregnane-3,20-dione,
$\Delta^4$-pregnene-17$\alpha$,21-diol-3,20-dione,
$\Delta^4$-pregnene-17$\alpha$,21-diol-3,11,20-trione,
$\Delta^4$-pregnene-3,20-dione,
$\Delta^4$-pregnene-11$\beta$,21-diol-3,20-dione,
$\Delta^4$-pregnene-21-ol-3,20-dione,
$\Delta^4$-pregnene-11$\beta$,17$\alpha$-triol-3,20-dione,
Allopregnane-3,20-dione,
$\Delta^4$-pregnene-21-ol-3,11,20-trione,
$\Delta^4$-pregnene-16$\alpha$,17$\alpha$,21-triol-3,20-dione,
9-fluoro-$\Delta^4$-pregnene-11$\beta$,17$\alpha$,21-triol-3,20-dione,
$\Delta^4$-pregnene-17$\alpha$-ol-3,20-dione, etc., and the compounds which are produced from the above compounds by esterifying, etherifying or replacing the hydroxyl group with a halogen, or by changing the oxo group into the ketal, hydrazone or semicarbazone form.

The reaction in the process of this invention is generally effected by bringing the starting material into contact with a microorganism selected from genus Pseudomonas or genus Serratia, or with the redox enzyme prepared from the microorganism under aerobic conditions. In this way the material is converted to the final product through one or more of the following changes: (1) formation of a double bond between $C_1$ and $C_2$ by dehydrogenation, (2) introduction of a hydroyl or oxo group into the 11-position, and (3) formation of a hydroxyl group by hydrogenation of the carbonyl group at the 20-position. Of the three changes, (2) may occur when the 11-position of the starting steroids are saturated with hydrogen and (3) when the starting steroids belong to the pregnane series having an oxo group at the 20-position.

When a steroid compound which is liable to undergo two or more of the above reactions is employed as the starting material, the number and order of the reactions to be effected depend upon the dynamic state of the redox enzyme system of the selected bacteria and other conditions such as incubation time, aeration and agitation conditions, composition of the medium, etc. Even when an enzyme produced by a certain species of the aforementioned genera is brought into contact with the material steroid, two or more of the above reactions may occur independently and simultaneously, producing the corresponding $\Delta^1$-dehydro and 11-position oxygenated compounds.

The invention is based on the novel perception that the above reactions are effected by bacteria belonging to the genus Pseudomonas or genus Serratia. There is nothing in the literature suggesting that the introduction of a hydroxyl or oxo group into the 11-position (the Reaction 2) may be effected by any microorganism, not to speak of those belonging to the genus Pseudomonas and the genus Serratia. Moreover, the yield of the steroid compounds produced by the present method is far more excellent than that in hitherto known methods in which other kinds of microorganisms are utilized.

In the present invention there is employed a strain of bacteria selected from the species belonging to the genus Pseudomonas (referred to as Ps. hereinafter) or the genus Serratia (referred to as S. hereinafter), and typical species are as follows:

Ps. boreopolis Gray and Thornton,
Ps. fluorescens Migula,
Ps. geniculata (Wright) Chester,
Ps. putida (Trevisan) Migula,
Ps. ovalis Chester,
Ps. convexa Chester,
Ps. mephitica Claydon and Hammer,
Ps. oleovorans Lee and Chandler,
Ps. arvilla Gray and Thornton,
Ps. aeruginosa (Schroeter) Migula,
Ps. coronafaciens (Elliot) Stevens,
Ps. mildenbergii Bergey et al.,
Ps. fragi (Eichholz) Huss emend. Hussong et al.,
Ps. taetrolens Hayens,
Ps. reptilivora Caldwell and Ryerson,
Ps. riboflavina Foster,
Ps. striafaciens (Elliott) Starr and Burkholder,
S. marcescens Bizio,
S. plymuthica (Lehmann and Neumann) Bergey et al.,
S. indica (Eisenberg) Bergey et al.,
S. kiliensis (Lehmann and Neumann) Bergey et al., and
S. piscatorum (Lehmann and Neumann) Breed.

The above species names are based on "Bergey's Manual of Determinative Bacteriology," 7th edition, published by The Williams and Wilkins Co., Baltimore, Md., U.S.A., in 1957. If any of the above species are designated differently by other nomenclatures, they are nevertheless included within the scope of microorganisms usable in the present invention.

The above exemplified microorganisms are available at the public type culture collections such as "Northern Utilization Research Branch, U.S. Department of Agriculture, Peoria, Ill., U.S.A.," "American Type Culture Collection, Washington, D.C., U.S.A," "Centraalbureau voor Schimmelcultures, Baarn," "Institute of Applied Microbiology, Tokyo University, Tokyo, Japan," "Institute for Fermentation, Osaka, Osaka, Japan" and "Nagao Institute, Tokyo, Japan."

The nutrient medium for growing the microorganisms should desirably contain carbon and nitrogen sources which they can assimilate and a small amount of inorganic salts necessary for their growth. As the carbon source there may be used glucose (or cerelose), maltose, sucrose, dextrin, starch, invert sugar and glycerol. As the nitrogen source there may be employed peptone, meat extracts, casein, and complex nitrogen sources such as edamine (lactalbumin digests), cornsteep liquor and soybean products, which are generally used for large scale fermentation, nitrogen-containing organic compounds such as urea, organic and inorganic ammonium salts and various kinds of nitrates. Inorganic salts such as potassium phosphate, sodium chloride, ferrous sulfate and magnesium sulfate may be present in the medium. Other growth factors such as vitamins and stimulants may be added to the medium, if necessary.

The microorganisms usable in the method of the present invention have the advantage of being able to grow sufficiently to attain the purpose of this invention in simpler media than those used for incubation of other microorganisms. The resting cells of the microorganisms can be used for the same purpose and in such a case the above-mentioned nutrients are not necessarily indispensable. Since the constitutive enzyme, besides the adaptive enzyme, of the microorganisms is utilized as the enzyme system in the present method, there is a saving in processes or time required for producing an adaptive enzyme necessary in usual (or other) microbiological reactions.

Typical media usable in the present method are as follows (percentages are by weight):

EXAMPLES OF THE COMPOSITION OF INCUBATION MEDIUM (1)

|  | Percent |
|---|---|
| C.S.L.[1] | 0.2 |
| $KH_2PO_4$ | 0.1 |
| $MgSO_4 \cdot 7H_2O$ | 0.05 |
| $FeSO_4$ | 0.001 |
| Glycerol | 2 |
| Urea | 0.2 |
| pH | 7.0 |

(2)

| C.S.L | 0.2 |
|---|---|
| $KH_2PO_4$ | 0.1 |
| $MgSO_4 \cdot 7H_2O$ | 0.05 |
| $FeSO_4$ | 0.001 |
| Glycerol | 2 |
| $NH_4NO_3$ | 0.2 |
| pH | 6.5 |

(3)

| C.S.L | 0.2 |
|---|---|
| $KH_2PO_4$ | 0.1 |
| $MgSO_4 \cdot 7H_2O$ | 0.05 |
| $FeSO_4$ | 0.001 |
| Ammonium lactate | 2 |
| pH | 6.5 |

(4)

| C.S.L | 0.2 |
|---|---|
| $KH_2PO_4$ | 0.01 |
| $MgSO_4 \cdot 7H_2O$ | 0.05 |
| $FeSO_4$ | 0.001 |
| Ammonium succinate | 2 |
| pH | 7.0 |

(5)

| Urea | 0.2 |
|---|---|
| $KH_2PO_4$ | 0.03 |
| $MgSO_4 \cdot 7H_2O$ | 0.02 |
| $FeSO_4$ | 0.001 |
| Glucose | 2 |
| pH | 7.8 |

(6)

| Glycerol | 1.0 |
|---|---|
| Peptone | 0.5 |
| Meat extracts | 0.5 |
| NaCl | 0.5 |
| pH | 7.0 |

(7)

| Edamine | 2 |
|---|---|
| Cerelose | 2 |
| C.S.L | 0.2 |

(8)

| Yeast extracts | 0.1 |
|---|---|
| $KH_2PO_4$ | 0.1 |
| $MgSO_4$ | 0.05 |
| $FeSO_4$ | 0.001 |

(9)

Tap water or distilled water.

[1] C.S.L. means "cornsteep liquor."

The remainder of the medium is made up by tap water or distilled water.

In the present method the microorganism may be incubated by stationary culture, but as they are of aerobic nature, shaking or submerged culture under aeration is preferable.

Starting steroid compounds may be brought into contact with the redox enzyme system by placing them in the medium during the incubation of the microorganisms. Or the microorganisms are incubated for a certain period and the grown cells are centrifuged out, and are then brought into contact with the starting steroid compounds in another medium. In the latter case, the medium need not necessarily contain the above-mentioned nutrients.

As the microorganisms belonging to the genus Pseudomonas or the genus Serratia can grow in media of relatively simple composition, transformation of the starting steroid compounds by the present method may be effected in a simplified medium for convenience of after-treatment.

The pH of the medium, reaction temperature (incubation temperature), reaction time (incubation period), and other conditions are subject to change according to the kind of the steroid compounds added, the steroid compounds to be produced, the microorganisms selected, mode of contact between the substrate and enzyme, and concentration of the medium. But in general the pH of about 6–9, reaction temperature of 20–37° C. and reaction time of 3–50 hours are preferable. These conditions, however, do not limit the scope of the present invention. When the incubation is conducted in a culture with a certain microorganism, Ps. boreopolis for example, for about 2–3 hours in the presence of a considerable amount, say about 5 volume percent of the culture medium, of a lower alcohol such as methanol and ethanol, a double bond is almost exclusively formed between $C_1$ and $C_2$ positions of the substrate. But, in the case when 20-one compound is used as the substrate, and if the incubation is further continued more than 3 hours, the hydrogenation of the 20-position occurs accompanied with the above reaction, and therefore $\Delta^1$-20-ol compound is accumulated in the culture.

On the other hand, in this reaction, if a far less amount of the same solvent as above, e.g. about 1 volume percent, is added to the culture medium, dehydrogenation between $C_1$ and $C_2$ positions and simultaneous hydrogenation of $C_{20}$ position of 20-one compound are effected even if the incubation is conducted for not more than 3 hours, and therefore $\Delta^1$-20-ol compound is accumulated in the culture.

Preferable concentration of the steroid substrate is 0.1–0.5% by weight in general, but other concentrations may bring about better results depending upon the kind of the microorganism used and the final product, and other culture conditions. Addition of the substrate is conducted at the beginning of the incubation or at a proper time thereafter. When the centrifuged cells are brought into contact with the substrate, the cells may be added to a medium containing the substrate. The substrate is added to the medium in one portion or over a period or intermittently in the form of fine powder or as a solution or a suspension in acetone, methanol, ethanol, propylene glycol, dioxane, dimethylformamide or water, for example, or as a solution or a suspension in a solvent containing a surface active agent or a dispersion agent.

To make the reaction proceed smoothly, it is desirable that the starting steroids exist in the medium as solution or in the form of as fine powder as possible.

The final products thus produced and accumulated in the medium are isolated by the following processes, for example: (a) the products are adsorbed on a suitable adsorbent such as activated charcoal and then eluted with a proper solvent such as methanol and ethanol, (b) the products are extracted with a proper solvent immiscible with water, such as chloroform, methylene chloride and ethylene chloride, or subjected to a counter current distribution method, (c) the products are chromatographed on a suitable carrier such as alumina, silica gel, cellulose, and pulp, (d) the products are separated, utilizing a difference in their solubilities between two solvents, (e) the products are first extracted in a solvent and then separated as derivatives of their functional groups, by using Girard's reagents, i.e. trimethylcarbonylhydrazinomethyl-ammonium chloride and hydrazinocarbonylmethylpyridinium chloride, or by acylation with a lower fatty acid anhydride and a deacidating agent, and the derivatives thus separated are reverted to the original compounds, respectively.

Presently-preferred representative embodiments of the invention are set forth solely by way of illustration and not at all by way of limitation, in the following examples. In these examples, the temperatures are uncorrected, and all analytical values are in percent by weight. "UV-spectrum" and "IR-spectrum" refer respectively to ultraviolet spectrum observed in an ethanolic solution of each sample and to infrared spectrum observed in a liquid paraffin suspension of each sample. "ATCC" refers to American Type Culture Collection, Washington, D.C.

*Example 1*

A portion of 50 cc. (cubic centimeters) of the afore-exemplified medium 1 in a 350 cc. shaking flask is sterilized for 15 minutes under a steam-pressure of 15 pounds per square inch. Two platinum earpicks of *Ps. oleovorans* Lee and Chandler are inoculated into the medium and incubated for 10 hours at about 28° C. under shaking (100–150 times a minute with an amplitude of 2 inches). Then 10 mg. (miligrams) of $\Delta^4$-pregnene-17$\alpha$, 21-diol-3,20-dione and 2.5 cc. of propylene glycol are added and the mixture is incubated for additional 10 hours under the same conditions as above. The liquid part is extracted with three 50 cc.-portions of ethyl acetate and the solid part with three 5 cc.-portions of acetone. Both extracts are combined and the solvent is distilled under reduced pressure in a stream of nitrogen at room temperature (20–30° C.). The remaining crystalline powder is a mixture of $\Delta^{1,4}$-pregnadiene-17$\alpha$,20$\beta$,21-triol-3-one and $\Delta^{1,4}$-pregnadiene-17$\alpha$,21-diol-3,20-dione, each of which is identified by the following tests:

(1) The powder is dissolved in a small quantity of chloroform and the solution is subjected to paper partition chromatography according to the method of Zaffaroni, i.e. developed with propylene glycol toluene, whereupon the respective spots appear at the corresponding zones.

(2) A portion of 1.0 g. (gram) of the powder is dissolved in 12.5 cc. of pyridine and 7.5 cc. of acetic anhydride is added. After standing for 24 hours at a room temperature, the solution is warmed at 50° C. for one hour and the solvent is distilled off under reduced pressure. The residue is dissolved in chloroform and the solution is washed with dilute hydrochloric acid, an aqueous solution of sodium carbonate and water successively, dried over anhydrous sodium sulfate and finally evaporated. The residue is developed on 280 g. of magnesium silicate with ether acetone, when the two compounds are separated from each other. During the chromatography the content of acetone is increased gradually. The two compounds are recrystallized from acetone respectively, obtaining 0.2 g. of colorless needles (A), M.P. 215–218° C. and 0.1 g. of colorless prisms (B), M.P. 178–179° C. The former is 21-acetoxy-$\Delta^{1,4}$-pregnadiene-17$\alpha$-ol-3,20-dione, with the following properties:

IR-spectrum: $\lambda$ max 3.00$\mu$, 5.75$\mu$, 5.82$\mu$, 6.03$\mu$, 6.20$\mu$, 6.25$\mu$, 11.20$\mu$.

*Analysis.*—Calcd. for $C_{23}H_{30}O_5$: C, 71.48 H, 7.82. Found: C, 71.26; H, 7.78.

To a solution of 0.4 g. of this substance in 40 cc. of methanol is added a solution of 0.42 g. of potassium bicarbonate in 5 cc. of water. After refluxing for one hour the mixture is concentrated under reduced pressure and the residue is extracted with chloroform. The chloroform solution is washed with water and dried over anhydrous sodium sulfate, and the solvent is distilled off. The residue is recrystallized from acetone to give 0.245 g. of colorless plates, M.P. 225–228° C. (decomp.). This product is $\Delta^{1,4}$-pregnadiene-17$\alpha$,21-diol-3,20-dione; cf. the following properties:

IR-spectrum: $\lambda$ max 3.00$\mu$, 5.80$\mu$, 6.00$\mu$, 6.18$\mu$, 6.22$\mu$.

*Analysis.*—Calcd. for $C_{21}H_{28}O_4$: C, 73.22; H, 8.19. Found: C, 73.01; H, 8.13.

The aforementioned compound (B) is 20$\beta$,21-diacetoxy-$\Delta^{1,4}$-pregnadiene-17$\alpha$-ol-3-one, and has the following properties:

$[\alpha]_D^{20} = +100°$ (c.=1.0%, $CHCl_3$).

UV-spectrum: $\lambda$ max 243m$\mu$ ($\epsilon$=15,900).

IR-spectrum: $\lambda$ max 2.87$\mu$, 5.78$\mu$, 6.04$\mu$, 6.16$\mu$, 6.25$\mu$, 11.30$\mu$.

*Analysis.*—Calcd. for $C_{25}H_{34}O_6$: C, 69.74; H, 7.96. Found: C, 69.49; H, 7.88.

To a solution of 0.65 g. of this acetylated compound in 50 cc. of methanol is added a solution of 1.2 g. of potassium bicarbonate in 5 cc. of water and the mixture is refluxed for one hour. The reaction mixture is concentrated under reduced pressure, the residue is dissolved in water and the solution is extracted with ether. The extract is washed with water and dried over anhydrous sodium sulfate, and the solvent is removed. The residue is recrystallized from acetone ether to give 0.22 g. of colorless prisms, M.P. 194–195° C. The product is identified as $\Delta^{1,4}$-pregnadiene-17$\alpha$,20$\beta$,21-triol-3-one from the following properties:

$[\alpha]_D^{20} = +33°$ (c.=1.0% $CHCl_3$).

UV-spectrum: $\lambda$ max 244$\mu$ ($\epsilon$—14,200).

IR-spectrum: $\lambda$ max 3.00$\mu$, 6.00$\mu$, 6.21$\mu$, 6.26$\mu$, 11.32$\mu$.

*Analysis.*—Calcd. for $C_{21}H_{30}O_4$: C, 72.80; H, 8.73. Found: C, 72.31; H, 8.40.

The above two compounds have the same properties as those of the corresponding products prepared by known methods, respectively.

The strain of *Ps. oleovorans* used in this example is on deposit at ATCC under the accession number ATCC-13474.

Example 2

*Ps. fluorescens* Migula is inoculated into a medium having the same composition as the afore-exemplified medium 3, and $\Delta^4$-pregnene-17$\alpha$,21-diol-3,20-dione is treated in the medium as in Example 1 to give $\Delta^4$-pregnene-17$\alpha$,20$\beta$,21-triol-3-one, which appears as a spot at the corresponding zone on a paper chromatogram.

The product is identified by the following experiments:

A portion of 200 mg. of the product is allowed to stand for 24 hours at room temperature together with 2.5 cc. of pyridine and 1.5 cc. of acetic anhydride, and the mixture, after being warmed for one hour at 50° C., is treated in the same manner as in Example 1. The product is recrystallized from acetone to give 150 mg. of colorless needles, M.P. 191–192° C. This substance has the properties shown below and is identified as 20$\beta$,21-diacetoxy-$\Delta^4$-pregnene-17$\alpha$-ol-3-one.

$[\alpha]_D^{20} = +133°$ (c.=1.0%, dioxane).

IR-spectrum: $\lambda$ max 2.95$\mu$, 5.77$\mu$, 6.06$\mu$, 6.21$\mu$.

Analysis.—Calcd. for $C_{25}H_{36}O_6$: C, 69.42; H, 8.39. Found: C, 69.60; H, 8.34.

To a solution of 100 mg. of this acetylated compound in 10 cc. of methanol is added a solution of 200 mg. of potassium bicarbonate in 1 cc. of water, and the mixture, after being refluxed for one hour, is concentrated under reduced pressure. The residue is diluted with a small quantity of water and extracted with chloroform. The extract is washed with water, dried over anhydrous sodium sulfate and evaporated, and the residue is recrystallized from acetone to give 80 mg. of colorless needles, M.P. 188–189° C., which is identified as $\Delta^4$-pregnene-17$\alpha$,20$\beta$,21-triol-3-one having the following properties:

$[\alpha]_D^{20} = +67°$ (c.=1.0%, dioxane).

IR-spectrum: $\lambda$ max 2.95$\mu$, 6.08$\mu$, 6.21$\mu$.

Analysis.—Calcd. for $C_{21}H_{32}O_4$: C, 72.38; H, 9.26. Found: C, 72.21; H, 9.18.

This compound is identified also by comparison with an authentic sample prepared by another method.

The strain of *Ps. fluorescens* used in this example is on deposit at ATCC under the accession number ATCC-13475.

Example 3

A portion of 30 liters of the synthetic medium before-exemplified as 3 is sterilized for 20 minutes under a steam pressure of 15 pounds per square inch. Into this medium is inoculated *Ps. boreopolis* Gray and Thornton and incubated for 24 hours at 28° C. under such aeration and agitation that 1 liter of sodium sulfite solution absorbs 6.3–7.0 millimoles of oxygen per hour (Kooper, Felsrome, Millar: Ind. Eng. Chem. 36, 504 (1944)). To the medium is added a mixture of 18 g. of $\Delta^4$-pregnene-17$\alpha$,21-diol-3,20-dione and 20 cc. of propylene glycol and the resulting suspension is incubated for 24 hours under the same conditions as above. The broth is filtered, and the cell bodies and filtrate are extracted with the same volume of ethyl acetate, respectively. The combined extracts are washed with $\frac{1}{10}$ volume of 2% aqueous solution of sodium bicarbonate, dried over anhydrous sodium sulfate (3–10 g. per liter) and evaporated to give a mixture of $\Delta^{1,4}$-pregnadiene-17$\alpha$,20$\beta$,21-triol-3-one and $\Delta^4$-pregnene-11$\beta$,17$\alpha$,21-triol-3,20-dione, each of which is identified by the following experiments:

To a solution of the product in 47 cc. of pyridine is added 29 cc. of acetic anhydride and the mixture is allowed to stand at room temperature for 22 hours and then kept at 50° C. for one hour. After removal of the solvent the residue is dissolved in chloroform, and the solution is washed with dilute hydrochloric acid, sodium bicarbonate solution and water successively, dried on anhydrous sodium sulfate and evaporated. Recrystallization of the residue from ether or acetone gives colorless prisms, M.P. 178–179° C. The product has the properties shown below and is identified as 20$\beta$,21-diacetoxy-$\Delta^{1,4}$-pregnadiene-17$\alpha$-ol-3-one:

$[\alpha]_D^{20} = +100°$ (c.=1.0%, CHCl$_3$).

UV-spectrum: $\lambda$ max 243.5 m$\mu$ ($\epsilon$=15,900).

IR-spectrum: $\lambda$ max 2.85$\mu$, 5.75$\mu$, 6.01$\mu$, 6.15$\mu$, 6.22$\mu$, 11.29$\mu$.

Analysis.—Calcd. for $C_{25}H_{34}O_6$: C, 69.74; H, 7.96. Found: C, 69.52; H, 7.92.

To a solution of 0.65 g. of this acetyl compound in 50 cc. of methanol is added a solution of 1.2 g. of potassium bicarbonate in 5 cc. of water and the mixture is refluxed for one hour. The reaction mixture is concentrated under reduced pressure, the residue is dissolved in water, and the solution is extracted with ether. The ethereal solution is washed with water and dried over anhydrous sodium sulfate, and the ether is distilled off. Recrystallization of the residue from acetone ether gives 0.22 g. of colorless prisms, M.P. 194–195° C. The product has the following properties and is identified as $\Delta^{1,4}$-pregnadiene-17$\alpha$,20$\beta$,21-triol-3-one:

$[\alpha]_D^{20} = +33°$ (c.=1.0% CHCl$_3$).

UV-spectrum: $\lambda$ max 244.5 m$\mu$ ($\epsilon$=14,200).

IR-spectrum: $\lambda$ max 3.00$\mu$, 6.00$\mu$, 6.20$\mu$, 6.25$\mu$, 11.30$\mu$.

Analysis.—Calcd. for $C_{21}H_{30}O_4$: C, 72.80; H, 8.73. Found: C, 72.53; H, 8.43.

The product is identified also by comparison with an authentic sample prepared by another process.

The mother liquor from the above product is developed on 100 g. of magnesium silicate with benzene/chloroform (1:1) and the crystalline substance separated from the chromatogram is recrystallized from methanol/acetone to give colorless grains, M.P. 214–216° C. The product has the following properties and is identified as 21-acetoxy-$\Delta^4$-pregnene-11$\beta$,17$\alpha$-diol-3,20-dione:

IR-spectrum: $\lambda$ max 2.95$\mu$, 3.05$\mu$, 5.75$\mu$, 5.85$\mu$, 6.15$\mu$.

Analysis.—Calcd. for $C_{23}H_{32}O_6$: C, 68.29; H, 7.97. Found: C, 67.91; H, 7.86.

The product is identified also by comparison with an authentic sample prepared by another method.

The strain of *Ps. boreopolis* used in this example is on deposit at ATCC under the accession number ATCC-13476.

Example 4

In the afore-exemplified medium 3 is incubated *S. marcescens* Bizio in the presence of $\Delta^4$-pregnene-17$\alpha$,21-diol-3,20-dione. The same treatment of the resulting broth as in Example 2 gives 150 mg. of $\Delta^{1,4}$-pregnadiene-17$\alpha$,21-diol-3,20-dione.

The product is identified by the tests described in Example 2. The strain of *S. marcescens* used in this example is on deposit at ATCC under the accession number ATCC 13477.

Example 5

To the afore-exemplified medium 9 are added the cell corps of *Ps. boreopolis* and $\Delta^4$-pregnene-17,21-diol-3,20-dione, and the mixture is treated as in Example 3 to give $\Delta^{1,4}$-pregnadiene-17$\alpha$,21-diol-3,20-dione, $\Delta^4$-pregnene-11$\beta$,17$\alpha$,21-triol-3,20-dione and $\Delta^{1,4}$-pregnadiene-17$\alpha$,20$\beta$,21-triol-3-one.

The products are identified by paper chromatography.

The strain of *Ps. boreopolis* used in this example is the same strain as used in Example 3.

Example 6

In the afore-exemplified medium 3 is incubated *S. plymuthica* (Lehmann and Neumann) Bergey in the presence of $\Delta^4$-pregnene-11$\beta$,17$\alpha$,21-triol-3,20-dione. The same treatment as in Example 1 gives $\Delta^{1,4}$-pregnadiene-11$\beta$,17$\alpha$,21-triol-3,20-dione.

The here-employed strain of *S. plymuthica* is on deposit at ATCC under the accession number ATCC-13478.

Example 7

In the afore-exemplified medium 4 is incubated Ps. oleovorans in the presence of $\Delta^4$-pregnene-17α,21-diol-3,20-dione. The same treatment as in Example 1 gives $\Delta^{1,4}$-pregnadiene-17α,21-diol-3,20-dione. The product is identified by comparison with an authentic sample prepared by another process. The strain of Ps. oleovorans used in this example is the same strain as used in Example 1.

Example 8

One platinum earpick of Ps. boreopolis incubated in a bouillon agar is inoculated in 50 cc. of the afore-exemplified medium 6 in a 200 cc.-shaking flask. The incubation is conducted using a rotary shaker for 18 hours at 28° C. The seed culture thus incubated in inoculated in 3 liters of the afore-exemplified medium 6 in a jar-fermenter, then the incubation is conducted for 6 hours at 28° C. under aeration (1.5 liters per minute) and agitation (250 r.p.m.). To the culture is added a solution of 1.2 g. of $\Delta^4$-pregnene-17α,21-diol-3,20-dione in 150 cc. of ethanol, then the incubation is continued for additional 3 hours under the same conditions as above.

After adjusting the pH to 4.0 with sulfuric acid, 50 cc. of the above culture is extracted with three 50 cc.-portions of ethyl acetate, and the extracts are combined, washed with 20 cc. of 1% aqueous solution of sodium carbonate and 20 cc. of distilled water, successively. After drying over anhydrous sodium sulfate, the solvent is evaporated under reduced pressure on a water bath at a temperature of 55° C. By a paper chromatography, it is evidenced that 850 mg. of $\Delta^{1,4}$-pregnadiene-17α,21-diol-3,20-dione is produced in the whole culture, and that other products are not present in the resultant mass.

The strain of Ps. boreopolis used in this example is the same strain as that used in Example 3.

Example 9

To a culture in which Ps. boreopolis is incubated in the same manner as in Example 8 is added a solution of 1.2 g. of $\Delta^4$-pregnene-17α,21-diol-3,20-dione in 30 cc. of ethanol. Further incubation is conducted for additional 2.5 hours under the same conditions as in Example 8. 635 mg. of $\Delta^{1,4}$-pregnadiene-17α,20β,21-triol-3-one, and no other products are found in the resultant mass.

The strain of Ps. boreopolis used in this example is the same strain as that used in Example 3.

Example 10

To a culture of Ps. oleovorans incubated in the same manner as in Example 8 is added a solution of $\Delta^4$-pregnene-17α,21-diol-3,20-dione in 60 cc. of ethanol. Further incubation is continued for additional 4 hours under the same conditions as in Example 8.

In the same manner as in Example 8, 660 mg. of $\Delta^{1,4}$-pregnadiene-17α,21-diol-3,20-dione, 108 mg. of $\Delta^{1,4}$-pregnadiene-17α,20β,21-triol-3-one and 204 mg. of $\Delta^{1,4}$-pregnadiene-11β,17α,21-triol-3,20-dione, are found in the product.

The strain of Ps. oleovorans used in this example is the same strain as that used in Example 1.

Example 11

A suspension of one platinum earpick of a culture of Ps. oleovorans on a bouillon agar in 10 cc. of sterilized distilled water is diluted to make its concentration 1/10. The diluted suspension is irradiated in Petri dishes with ultraviolet ray for 1 to 5 minutes by means of a 30 watt ultraviolet ray lamp from a distance of 54 cm. (centimeters) from the dishes. The culture is inoculated on a bouillon agar, then the colonies grown on the agar are again inoculated on other bouillon agars. A certain culture selected from the cultures is inoculated in 500 cc. of the afore-exemplified medium 6 in a 3 liter-culture flask, and is incubated for 18 hours at 28° C. under shaking. The seed culture thus obtained in inoculated in a 30 liter stainless steel tank, and the incubation is conducted for 5 hours at 28° C. To the culture is added a solution of 12 g. of $\Delta^4$-pregnene-17α,21-diol-3,20-dione in 750 cc. of ethanol, then further incubation is effected for additional 12 hours under the same conditions as above. By means of paper chromatography of an extract obtained by extracting the broth with ethyl acetate, it is evidenced that 2.5 g. of $\Delta^{1,4}$-pregnadiene-17α,21-diol-3,20-dione, 0.6 g. of $\Delta^{1,4}$-pregnadiene-17α,20β,21-triol-3-one and 3.8 g. of $\Delta^{1,4}$-pregnadiene-11β,17α,21-triol-3,20-dione are present in the culture broth.

The whole culture broth is treated in a manner similar to that described in Example 1, that is:

The culture broth is extracted with ethyl acetate at pH 4.0, then the ethyl acetate solution is evaporated to dryness under reduced pressure to obtain 9.1 g. of crystalline powder. After acetylating the crude powder by means of pyridine and acetic anhydride, the resulting products are subjected to column chromatography on magnesium silicate, and the column is developed with ether-acetone, the acetone content being increased in order to separate the products into three fractions. From the first fraction is obtained 21 - acetoxy-$\Delta^{1,4}$-pregnadiene-17α-ol-3,20-dione which gives 2.0 g. of colorless needles, M.P. 215–218° C., after recrystallization from acetone. From the second fractions is obtained 20β,21-diacetoxy-$\Delta^{1,4}$-pregnadiene-17-α-ol-3-one which gives 300 mg. of colorless prisms, M.P. 178–179° C., after recrystallization from acetone. From the last fraction is obtained 3.3 g. of colorless grains, M.P. 230° C., when the product is recrystallized from dioxane-ethyl acetate. The product has the following properties, and therefore it is identified as 21-acetoxy-$\Delta^{1,4}$-pregnadiene-11β,17α-diol-3,20-dione.

$[\alpha]_D^{20} = +116°$ (c.=1.0%, dioxane).

UV-spectrum: λ max 243 mμ (ε=15,300).

IR-spectrum: λ max 2.99μ, 3.07μ, 5.74μ, 5.82μ, 6.07μ, 6.30μ, 11.29μ.

Analysis.—Calcd. for $C_{23}H_{30}O_6$: C, 68.63; H, 7.51. Found: C, 68.37; H, 7.38.

Each of the above three products is identified with respective authentic samples.

The strain of Ps. oleovorans used in this example is the same strain as used in Example 1.

The hereinbefore-described products are all known. They comprise adrenocortical hormones, male sex hormones and female sex hormones, all of which are of known therapeutic utility and are administrable in known manner (e.g. orally or parenterally); they also comprise intermediates useful in known manner in the preparation of such therapeutically useful compounds.

Having thus disclosed the invention, what is claimed is:

1. A process for converting $\Delta^4$-pregnene-17α,21-diol-3,20-dione into $\Delta^{1,4}$-pregnadiene-17α,20β,21-triol-3-one which comprises subjecting the starting steroid, as steroid substrate, to the action of Pseudomonas oleovorans while culturing the latter in a fermentation medium therefor, and recovering the so-formed $\Delta^{1,4}$-pregnadiene-17α,20β,21-triol-3-one from the reaction mixture.

2. A process for converting $\Delta^4$-pregnene-17α,21-diol-3,20-dione into $\Delta^{1,4}$-pregnadiene-17α,21-diol-3,20-dione which comprises subjecting the starting steroid, as steroid substrate, to the action of Pseudomonas oleovorans while culturing the latter in a fermentation medium therefor, and recovering the so-formed $\Delta^{1,4}$-pregnadiene-17α,21-diol-3,20-dione from the reaction mixture.

3. A process for converting $\Delta^4$-pregnene-17α,21-diol-3,20-dione into $\Delta^4$-pregnene-17α,20β,21-triol-3-one which comprises subjecting the starting steroid, as steroid substrate, to the action of Pseudomonas fluorescens while culturing the latter in a fermentation medium therefor, and recovering the so-formed $\Delta^4$-pregnene-17α,20β,21-triol-3-one from the reaction mixture.

4. A process for converting $\Delta^4$-pregnene-17α,21-diol- 3,20-dione into $\Delta^{1,4}$-pregnadiene-17α,20β,21-triol-3-one which comprises subjecting the starting steroid, as steroid substrate, to the action of *Pseudomonas boreopolis* while culturing the latter in a fermentation medium therefor, and recovering the so-formed $\Delta^{1,4}$-pregnadiene-17α,20β,21-triol-3-one from the reaction mixture.

5. A process for converting $\Delta^4$-pregnene-17α,21-diol-3,20-dione which comprises subjecting the starting steroid, as steroid substrate, to the action of *Pseudomonas boreopolis* while culturing the latter in a fermentation medium therefor, and recovering the so-formed $\Delta^4$-pregnene-11β,17α,21-triol-3,20-dione from the reaction mixture.

6. A process for converting $\Delta^4$-pregnene-17α,21-diol-3,20-dione into $\Delta^{1,4}$-pregnadiene-17α,21-diol-3,20-dione which comprises subjecting the starting steroid, as steroid substrate, to the action of *S. marcescens* while culturing the latter in a fermentation medium therefor, and recovering the so-formed $\Delta^{1,4}$-pregnadiene-17α,21-diol-3,20-dione from the reaction mixture.

7. A process for converting $\Delta^4$-pregnene-17α,21-diol-3,20-dione into $\Delta^{1,4}$-pregnadiene-17α,21-diol-3,20-dione which comprises subjecting the starting steroid, as steroid substrate, to the action of *Pseudomonas boreopolis* while culturing the latter in a fermentation medium therefor, and recovering the so-formed $\Delta^{1,4}$-pregnadiene-17α,21-diol-3,20-dione from the reaction mixture.

8. A process for converting $\Delta^4$-pregnene-11β,17α,21-triol-3,20-dione into $\Delta^{1,4}$-pregnadiene-11β,17α,21-triol-3,20-dione which comprises subjecting the starting steroid, as steroid substrate, to the action of *S. plymuthica* while culturing the latter in a fermentation medium therefor, and recovering the so-formed $\Delta^{1,4}$-pregnadiene-11β,17α,21-triol-3,20-dione from the reaction mixture.

9. A process for converting $\Delta^4$-pregnene-17α,21-diol-3,20-dione into $\Delta^{1,4}$-pregnadiene-17α,21-diol-3,20-dione which comprises subjecting the starting steroid, as steroid substrate, to the action of *Pseudomonas boreopolis* while culturing the latter in a fermentation medium therefor, and recovering the so-formed $\Delta^{1,4}$-pregnadiene-17α,21-diol-3,20-dione from the reaction mixture.

10. A process for converting $\Delta^4$-pregnene-17α,21-diol-3,20-dione into $\Delta^{1,4}$-pregnadiene-11β,17α,21-triol-3,20-dione which comprises subjecting the starting steroid, as steroid substrate, to the action of *Pseudomonas oleovorans* while culturing the latter in a fermentation medium therefor, and recovering the so-formed $\Delta^{1,4}$-pregnadiene-11β,17α,21-triol-3,20-dione from the reaction mixture.

11. A process for preparing $\Delta^{1,4}$-3,20-dioxo-steroid compounds of the pregnane series, which comprises bringing a $\Delta^4$-3,20-dioxo-steroid compound of the pregnane series into contact with cell bodies grown by culturing a microorganism of the genus Serratia and maintaining such contact until the ensuing reaction is essentially completed, whereby a double bond is introduced at the position 1 of the starting steroid compound.

12. A process for preparing $\Delta^{1,4}$-3,20-dioxo-steroid compounds of the pregnane series, which comprises bringing a $\Delta^4$-3,20-dioxo-steroid compound of the pregnane series into contacts with cell bodies grown by culturing *Serratia marcescens* and maintaining such contact until the ensuing reaction is essentially completed, whereby a double bond is introduced at the position 1 of the starting steroid compound.

13. A process for preparing $\Delta^{1,4}$-3,20-dioxo-steroid compounds of the pregnane series, which comprises bringing a $\Delta^4$-3,20-dioxo-steroid compound of the pregnane series into contact with cell bodies grown by culturing *Serratia plymuthica* and maintaining such contact until the ensuing reaction is essentially completed, whereby a double bond is introduced at the position 1 of the starting steroid compound.

References Cited in the file of this patent

Prescott et al.: Industrial Microbiology, 3d Edition, McGraw-Hill Book Co., Inc., 1959, page 756.

Journal of Biological Chemistry, 1953, vol. 205, pp. 823–837.

Nature, 1954, vol. 173, pages 1189–90.